(12) United States Patent
Huang (10) Patent No.: US 11,618,694 B2
(45) Date of Patent: Apr. 4, 2023

(54) ULTRAVIOLET LIGHT-EMITTING FAUCET

(71) Applicants: DAWNWAY ENTERPRISE CO., LTD., Taichung (TW); Miaoyun Huang, Visalia, CA (US)

(72) Inventor: Wen-Shun Huang, Taichung (TW)

(73) Assignee: Miaoyun Huang, Visalia, CA (US)

(*) Notice: Subject to any disclaimer, the term of this patent is extended or adjusted under 35 U.S.C. 154(b) by 391 days.

(21) Appl. No.: 17/018,771

(22) Filed: Sep. 11, 2020

(65) Prior Publication Data

US 2022/0081324 A1 Mar. 17, 2022

(51) Int. Cl.
*C02F 1/32* (2006.01)
*E03C 1/04* (2006.01)
*C02F 1/00* (2006.01)

(52) U.S. Cl.
CPC .............. *C02F 1/325* (2013.01); *C02F 1/003* (2013.01); *C02F 1/32* (2013.01); *E03C 1/04* (2013.01); *C02F 2201/005* (2013.01); *C02F 2201/326* (2013.01); *C02F 2201/3222* (2013.01); *C02F 2201/3227* (2013.01); *C02F 2303/04* (2013.01); *C02F 2307/06* (2013.01)

(58) Field of Classification Search
CPC .. C02F 1/003; C02F 1/32; C02F 1/325; C02F 2201/005; C02F 2201/3222; C02F 2201/3227; C02F 2201/326; C02F 2303/04; C02F 2307/06; E03C 1/04
USPC ............................................. 250/436, 455.11
See application file for complete search history.

(56) References Cited

U.S. PATENT DOCUMENTS 10,738,446 B1 * 8/2020 Munn ...................... A61L 2/24

FOREIGN PATENT DOCUMENTS

| CN | 205479692 U | 8/2016 |
|----|-------------|--------|
| CN | 109667982 A | 4/2019 |

* cited by examiner

*Primary Examiner* — Kiet T Nguyen
(74) *Attorney, Agent, or Firm* — Muncy, Geissler, Olds & Lowe, P.C.

(57) ABSTRACT

The present invention discloses an ultraviolet light-emitting faucet comprising an inlet assembly, an outlet assembly, an operation assembly configured between the inlet assembly and the outlet assembly, and a waterproof light emitting module disposed in the operation assembly. The operation assembly has a conduit and an operation room that communicates, the waterproof light emitting module is disposed in the conduit and capable of emitting an ultraviolet light into the operation room in order to sterilize the water flowing through the operation room.

20 Claims, 6 Drawing Sheets

ULTRAVIOLET LIGHT-EMITTING FAUCET

BACKGROUND OF INVENTION

1. Field of Invention

The present invention relates to a faucet and, more particularly, to an ultraviolet light-emitting faucet.

2. Related Prior Art

To ensure safety of potable water, a faucet can be equipped with an ultraviolet light-emitting module for the sterilization of potable water. For example, CN109667982A and CN205479692U both disclose an ultraviolet light-emitting faucet.

SUMMARY OF INVENTION

It is the primary objective of the present invention to provide an ultraviolet light-emitting faucet.

To achieve the foregoing objective, the ultraviolet light-emitting faucet includes an inlet assembly, an outlet assembly, an operation assembly and a waterproof light emitting module. The inlet assembly comprises an inlet channel, the outlet assembly comprises an outlet pipe, and the operation assembly is configured between the inlet assembly and the outlet assembly. The operation assembly comprises a conduit and an operation room which communicates to each other; the conduit comprises an entrance and an exit. The entrance is for receiving the water from the inlet channel, and the exit is for discharging the water from the inlet channel. The operation room is disposed between the entrance and the exit of the conduit, it comprises at least two openings; one of the openings is for the water to flow into the operation room and the other opening is for the water to flow out of the operation room. The waterproof light emitting module is configured in the conduit of the operation assembly; it is capable of generating an ultraviolet light to emit into the operation room through either one of the two openings of the operation room.

In another aspect, the waterproof light emitting module is disposed between the entrance of the conduit and the opening that is for the water to flow into the operation room. Also, the ultraviolet light generated by the waterproof light emitting module is emitted into the operation room through the opening that is for the water to flow into the operation room.

In another aspect, the waterproof light emitting module is disposed between the exit of the conduit and the opening that is for the water to flow out of the operation room. Also, the ultraviolet light generated by the waterproof light emitting module is emitted into the operation room through the opening that is for the water to flow out of the operation room.

In another aspect, the operation room is of sphere shaped, and the two openings have smaller internal diameter than the operation room.

In another aspect, the waterproof light emitting module comprises a waterproof casing and a circuit board disposed in the waterproof casing. The waterproof casing comprises a light emitting surface and the light emitting surface faces either one of the two openings of the operation room. The ultraviolet light generated from one or a plurality of ultraviolet light LEDs on the circuit board is emitted to one of the openings of the operation room through the light emitting surface of the waterproof casing.

In another aspect, the operation assembly comprises a housing, a chamber and a seat. The housing has a receiving room, and one end of the receiving room communicates with the exit of the conduit, and the other end of the receiving room connects with the inlet assembly. The chamber is fitted into the receiving room of the housing. The seat is secured in the receiving room of the housing and has a cave and an axial channel. The cave receives the waterproof light emitting module; the cave and the waterproof light emitting module have at least a gap in between them. One end of the axial channel forms into the entrance of the conduit and the other end of the axial channel communicates with the cave. Moreover, the waterproof light emitting module and the housing maintains a space, and the space communicates with the gap.

In another aspect, the seat comprises a plurality of hooks that extends in the direction towards the chamber. The plurality of hooks hooks onto a periphery of the waterproof light emitting module.

In another aspect, the waterproof light emitting module comprises a waterproof casing, a circuit board and a cable. The circuit board is disposed in the waterproof casing, and the cable is connected to the circuit board and extends out of the waterproof casing. The waterproof casing further comprises a light emitting surface; the light emitting surface faces one of the openings of the operation room. The ultraviolet light generated from one or a plurality of the ultraviolet light LEDs on the circuit board is emitted to one of the openings of the operation room through the light emitting surface of the waterproof casing. The seat comprises a cable aperture that communicates with the cave. The inlet assembly comprises a cable channel, and the cable of the waterproof light emitting module passes through the cable aperture of the seat and the cable channel of the inlet assembly.

In another aspect, the chamber comprises a plurality of protrusive portions. The protrusive portions are disposed around the opening that is for allowing the water to flow into the operation room and sit on the waterproof light emitting module. Also, the protrusive portions maintain a gap between each other.

In another aspect, the protrusive portions comprise an end protruding into the opening that is for allowing the water to flow into the operation room of the operation room.

In another aspect, a sensing device is coupled to the waterproof light emitting module. The sensing device senses the water entering the inlet channel of the inlet assembly and turns on the waterproof light emitting module. On the other hand, the waterproof light emitting module turns off when the sensing device senses no water in the inlet channel of the inlet assembly.

In another aspect, an automatic manoeuvre set comprises an inlet control valve, a sensing device and a water source. The inlet control valve is connected to the inlet assembly, the sensing device is coupled to the inlet control valve and the water source is connected to the inlet control valve. The sensing device controls the on and off of the inlet control valve; it decides if the water from the water source is entering the inlet channel of the inlet assembly. The automatic manoeuvre set is further coupled to the waterproof light emitting module and when the sensing device commands the inlet control valve to turn on, the waterproof light emitting module will turn on as well. On the other hand, when the inlet control valve automatically turns off, the waterproof light emitting module will turn off as well.

In another aspect, the indicating device comprises a casing and a visible light emitting element that is located in the casing. The casing has a transmitting portion, and the light emitted by the visible light emitting element is emitted through the transmitting portion.

In another aspect, the indicating device is configured to a lower surface of the inlet assembly, and the operation assembly is configured to an upper surface of the inlet assembly.

In another aspect, a base has two adjacent holes, and the indicating device is tightly clamped between the base and the inlet assembly. The casing of the indicating device has two adjacent through-holes so that the two ends of one of the through-holes respectively faces one of the holes of the base and the inlet channel of the inlet assembly.

In another aspect, the ultraviolet light detecting module is coupled to the waterproof light emitting module and can generate a warning signal when detected that the waterproof light emitting module cannot emit ultraviolet light.

In another aspect, the securing ring is secured in the housing of the operation assembly and abuts against the seat.

In another aspect, the seat has an extending section and the extending section is fitted into the inlet channel of the inlet assembly so that the inlet channel communicates with the axial channel that formed in the extending section.

In another aspect, the bolt is secured in the inlet assembly and one end of the bolt is extended into a ring groove of the extending section of the seat.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
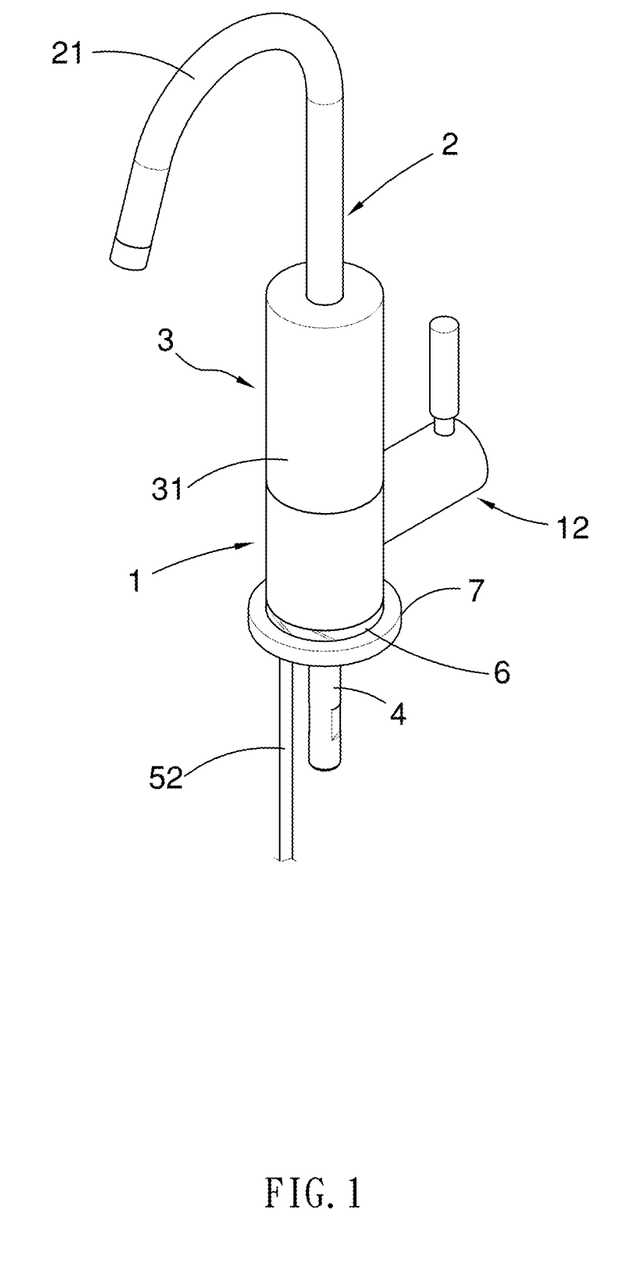
FIG. 1 is a perspective view of an ultraviolet light-emitting faucet of the preferred embodiment of the present invention.
Figure 2:
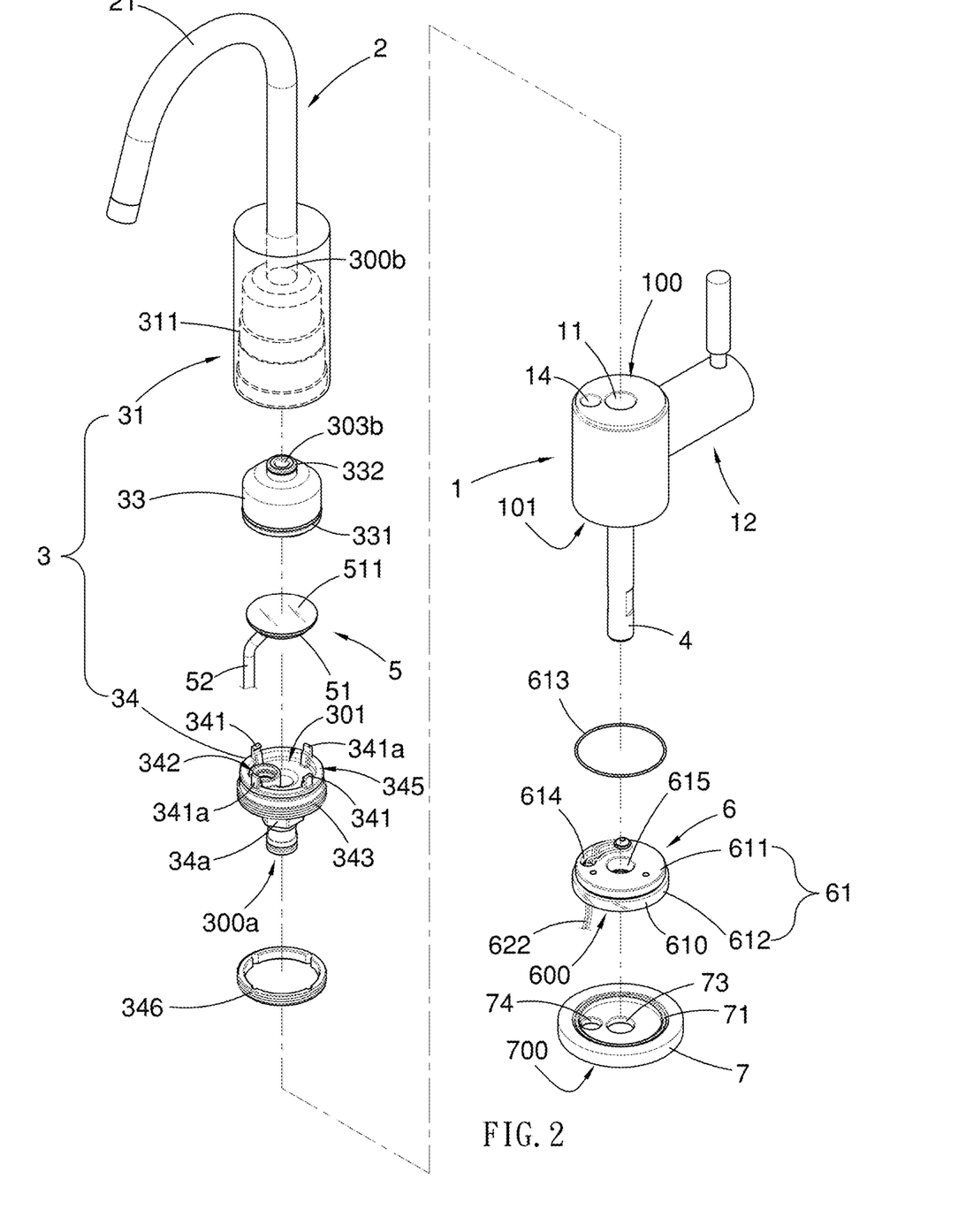
FIG. 2 is a perspective exploded view of the preferred embodiment of the present invention.

FIGS. 1 and 2 show a preferred embodiment of an ultraviolet light-emitting faucet of the present invention, the embodiment comprises an inlet assembly 1, an outlet assembly 2, an operation assembly 3 configured between the inlet assembly 1 and the outlet assembly 2, and a waterproof light emitting module 5 configured in the operation assembly 3.

The inlet assembly 1 having an inlet channel 11 for inputting water, the outlet assembly 2 having an outlet pipe 21 for discharging water to an external space. In the embodiment, an inlet pipe 4 is connected with screw to an end of the inlet assembly 1, so that the water supplied from a water source (e.g. a water purifier, not shown) can enter the inlet channel 11 through the inlet pipe 4. Preferably, the inlet assembly 1 further comprises a manual manoeuvre set 12; the manual manoeuvre set 12 controls the opening and the closing of the inlet channel 11 to decide whether the outlet pipe 21 discharges the water.

However, the above mentioned manual manoeuvre set 12 is not necessary. In another embodiment, referring to FIG. 10, an automatic manoeuvre set 12a is also an option as a replacement. The automatic manoeuvre set comprises an inlet control valve 121 connected to the inlet assembly 1 and a sensing device 122 coupled to the inlet control valve 121. The two ends of the inlet control valve 121 are respectively connected to the inlet pipe 4 and the water source 4a. The sensing device 122 controls the on and off of the inlet control valve 121 to decide whether the water supplied from the water source 4a enters the inlet channel 11 of the inlet assembly 1. The sensing device 122 can be disposed on the inlet assembly 1, but not limited to so. The inlet control valve 121 is normally turned off and therefore the water cannot enter the inlet assembly 1 and the outlet pipe 21 of the outlet assembly 2 cannot discharge the water. The sensing device 122 can be a touch sensing device. The touch sensing device will send a signal to the inlet control valve 121 once it is activated by touch, so that the inlet control valve 121 is turned on, and then, the water supplied from the water source 4a will enter the inlet assembly 1 through the inlet pipe 4 and flow through the operation assembly 3 and finally, the outlet pipe 21 of the outlet assembly 2 will output the water. The sensing device 122 can also be an infrared sensing device or other non-contact sensing devices. Once the infrared sensor detects the proximity of the hand, it will send a signal to the inlet control valve 121 to turn on the inlet control valve 121, which then the outlet pipe 21 of the outlet assembly 2 will discharge the water. It should be pointed out that in the embodiment, the inlet control valve 121 will turn off automatically after being turned on for a preset period of time, so that the outlet pipe 21 of the outlet assembly 2 stops discharging water.

Figure 3:
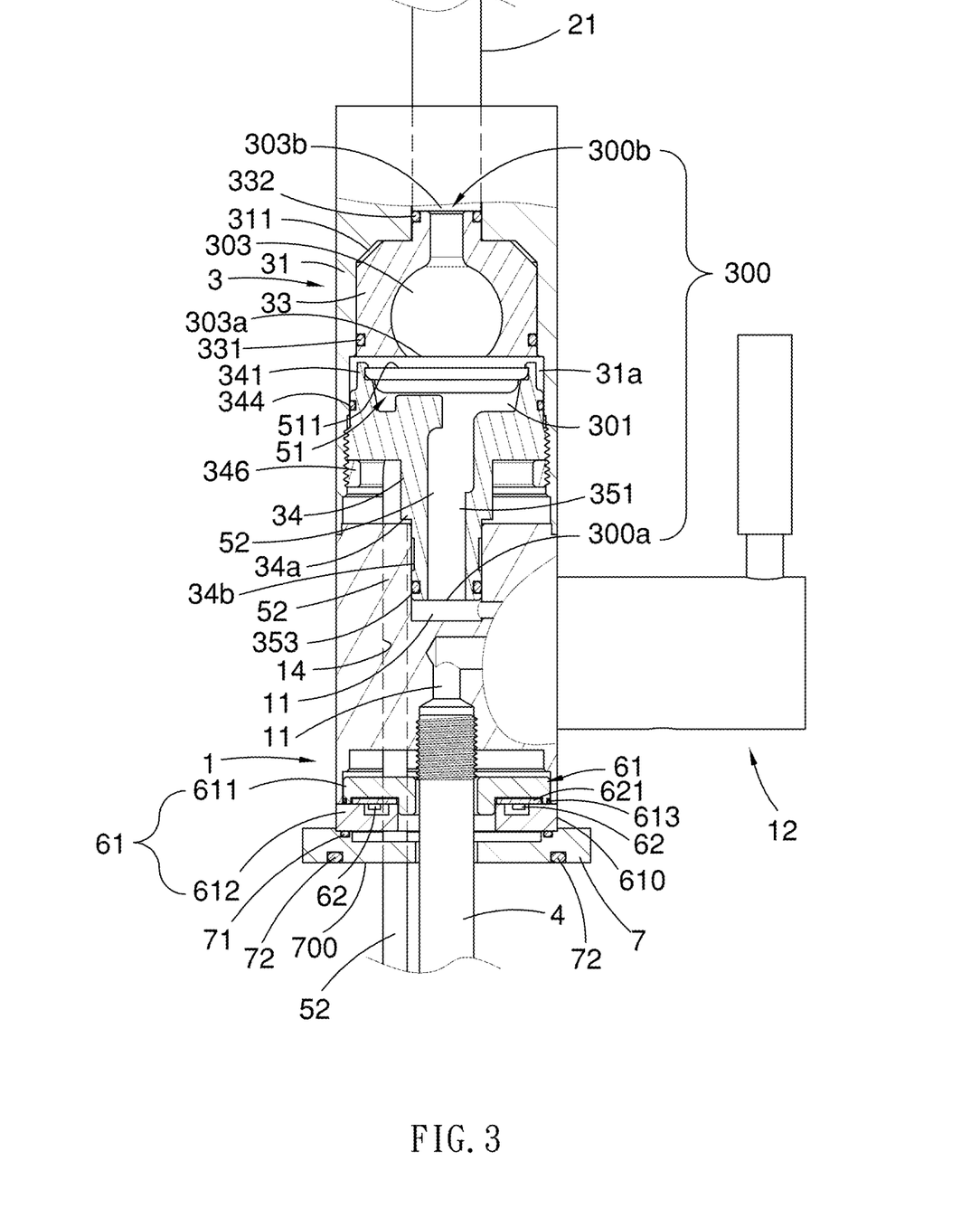
FIG. 3 is a cross-sectional view of the preferred embodiment of the present invention.

Referring to FIGS. 2 and 3, the operation assembly 3 having a conduit 300 and an operation room 303 that communicates, the conduit 300 having an entrance 300a and an exit 300b. The entrance 300a communicates with the inlet channel 11 of the inlet assembly 1 to receive the water from the inlet channel 11, and the exit 300b communicates with the outlet pipe 21 so that the water discharged from the exit 300b can discharge through the outlet pipe 21. The operation room 303 is located between the entrance 300a and the exit 300b of the conduit 300. The operation room 303 further has at least two openings that are an opening 303a and an opening 303b shown in FIGS. 2, 3, and 6. The opening 303a is for allowing the water to flow into the operation room 303, and the other opening 303b is for allowing the water to flow out of the operation room 303. In the embodiment, the exit 300b of the conduit 300 is very close to the opening 303b of the operation room 303, they are almost overlapping each other but it is not necessary.

The waterproof light emitting module 5 is configured in the conduit 300 of the operation assembly 3 and capable of projecting an ultraviolet light from the opening 303a or the opening 303b of the operation room 303 into the operation room 303. In the embodiment, the waterproof light emitting module 5 is disposed between the entrance 300a of the conduit 300 and the opening 303a of the operation room 303. Therefore, the ultraviolet light projected by the waterproof light emitting module 5 projects into the operation room 303 from the opening 303a, so that the direction of the ultraviolet light is the same as the water flow direction, but not limited to so. For example, when the waterproof light emitting module 5 is disposed between the exit 300b of the conduit 300 and the opening 303b of the operation room 303, the ultraviolet light projected by the waterproof light emitting module 5 projects into the operation room 303 from the opening 303b, so that the direction of the ultraviolet light is the opposite to the water flow direction.

In the embodiment, referring to FIGS. 2, and 3, the waterproof light emitting module 5 further comprises a waterproof casing 51 and a circuit board (not shown) disposed in the waterproof casing 51. The waterproof casing 51 has a light emitting surface 511; the light emitting surface 511 can be a surface of a transparent acrylic plate or a glass plate. Regardless, the light emitting surface 511 faces the opening 303a or the opening 303b of the operation room 303, depending on the location of the waterproof light emitting module 5. For example, in the embodiment, the light emitting surface 511 is facing the opening 303a of the operation room 303. Additionally, a circuit is formed on the circuit board 6, the ultraviolet light projected from a LED or a plurality of LEDs in the circuit is projected from the light emitting surface 511 of the waterproof casing 51 and projects into the operation room 303 through the opening 303a.

In the embodiment, referring to FIGS. 2, and 3, the operation assembly 3 further comprises a housing 31, a chamber 33, and a seat 34. The housing 31 is configured to an upper face 100 of the inlet assembly 1 and has a receiving room 311, one end of the receiving room 311 communicates with the exit 300b of the conduit 300, and the other end of the receiving room 311 connects to the inlet assembly 1.

The chamber 33 can be formed into one with the housing 31, and can also be an independent entity outside of the housing 31. In any case, the water entering from the entrance 300a of the conduit 300 must flow through the operation room 303 formed in the chamber 33, and then flow into the outlet pipe 21 that is disposed in the exit 300b of the housing 31. In the embodiment, the chamber 33 independent outside of the housing 31 is fitted into the receiving room 311 of the housing 31, and the chamber 33 can be made of polytetrafluoroethylene, but not limited to so. Additionally, in order to prevent the water from leakage, one or a plurality of annular seals 331 and 332 can be disposed between the chamber 33 and the receiving room 311 of the housing 31.

In the embodiment, referring to FIGS. 5-8, the chamber 33 further comprises a plurality of protrusive portions 333 that protrudes from a lower surface 330 of the chamber 33, the protrusive portions 333 are arranged around the opening 303a of the operation room 303 and sit on the light emitting surface 511 of the waterproof casing 51 of the waterproof light emitting module 5. The protrusive portions 333 also maintain a gap 334 between each other. Preferably, an end 333a of each protrusive portion 333 protrudes into the opening 303a of the operation room 303. Furthermore, in order to clearly show the conduit 300, the protrusive portions 333 are omitted in FIG. 2.

Figure 4:
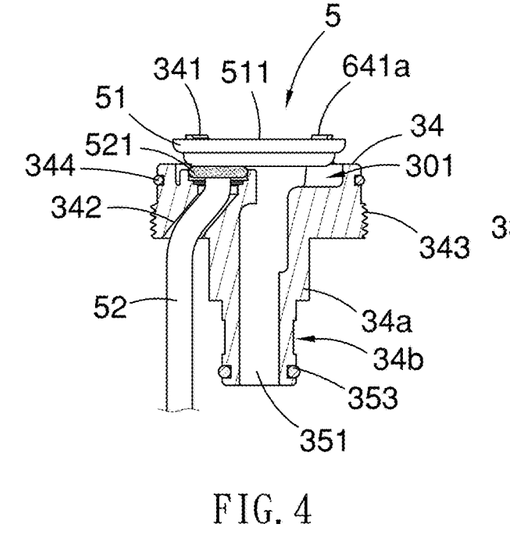
FIG. 4 is a cross-sectional view of the seat of the preferred embodiment of the present invention.
Figure 5:
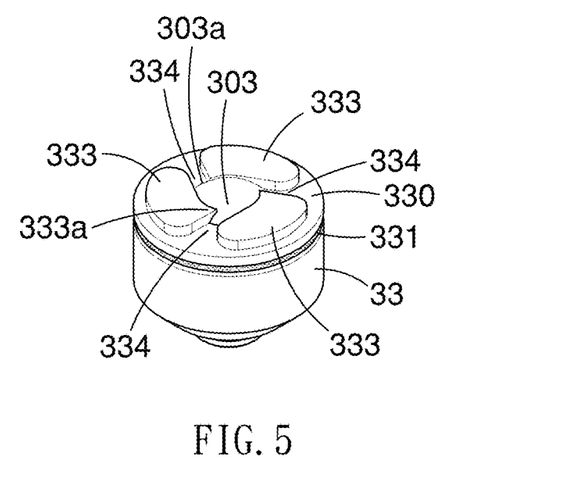
FIG. 5 is a perspective view of the chamber of the preferred embodiment of the present invention.
Figure 8:
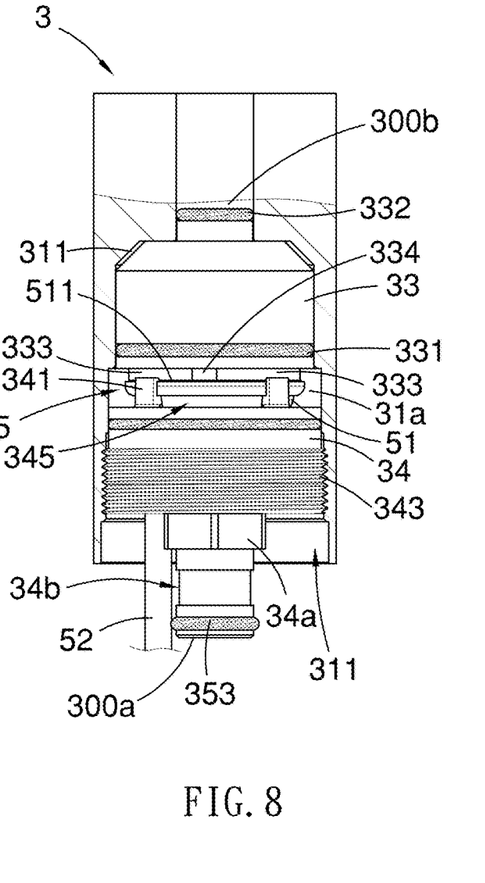
FIG. 8 is a cross-sectional view of the operation assembly of the preferred embodiment of the present invention.

Referring to FIGS. 2-4, the seat 34 is secured in the receiving room 311 of the housing 31. The seat 34 has a cave 301 and an axial channel 351; the cave 301 receives the waterproof light emitting module 5. Referring to FIGS. 3 and 8, the cave 301 and the waterproof light emitting module 5 maintains one or a plurality of gaps 345 between each other. Referring to FIG. 2, the waterproof light emitting module 5 and the housing 31 of the operation assembly 3 further maintains a space 31a; the space 31a and the gaps 345 communicates. One end of the axial channel 351 is formed into the entrance 300a of the conduit 300 and the other end of the axial channel 351 communicates with the cave 301.

In the embodiment, the seat 34 is also screwed to the housing 31 of the operation assembly 3 through a threaded section 343 so that the seat 34 is secured in the receiving room 311, but the securing manner of the seat 34 is not limited to so. Referring to FIGS. 2 and 3, to strengthen the securing of the seat 34, a securing ring 346 is also screwed to the housing 31 and abuts against the seat 34. Furthermore, an extending section 34a of the seat 34 is further fitted into the inlet channel 11 of the inlet assembly 1, so that the inlet channel 11 communicates with the axial channel 351 formed in the extending section 34a. Additionally, to prevent the water from leakage, one or a plurality of annular seals 344 and 353 can be disposed between the seat 34 and the housing 31.

Preferably, the seat 34 also has a plurality of hooks 341 extending in the direction towards the chamber 33, the hooks 341 hooks onto a periphery of the waterproof light emitting module 5. In the embodiment, the seat 34 further has a plurality of blocking posts 341a extending in the direction towards the chamber 33, the blocking posts 341a and the hooks 341 are arranged around the periphery of the cave 301, and the gaps between them are the gaps 345 mentioned above.

The waterproof light emitting module 5 can be provided with a battery (not shown) installed in the housing 31 to supply the required power, but not limited to so. For example, in the embodiment, the waterproof light emitting module 5 is connected a cable 52 and obtains power from a domestic power supply through the cable 52. The cable 52 is connected to the circuit board of the waterproof light emitting module 5 and extends out of the waterproof casing 51. The seat 34 has a cable aperture 342; the inlet assembly 1 has a cable channel 14, and the cable 52 of the waterproof light emitting module 5 passes through the cable aperture 342 of the seat 34 and the cable channel 14 of the inlet assembly 1. Preferably, the seat 34 can be made of plastic material, such as Polyoxymethylene (POM) commonly known as plastic steel, but not limited to so. Additionally, to prevent the water from leakage, referring to FIG. 4, an annual seal 521 can be disposed between the cable 52 and the cable aperture 342 of the seat 34. In which, the cable 52 comprises a plurality of wires (not shown), the wires are used to transmit the power and related electrical signals required by the circuit.

As mentioned above, in the embodiment, referring to FIGS. 2 and 8, the conduit 300 of operation assembly 3 comprises the above mentioned the entrance 300a, the axial channel 351, the cave 301, the gap 345, the space 31a, the gaps 334 between each protrusive portion 333, and the exit 300b, while the operation room 303 is actually located between the exit 300b and the cave 301. Therefore, when the manual maneuvers set 12 is turned on to a position to open the inlet channel 11, the water supplied by the water source 4a will flow from the inlet pipe 4 into the inlet assembly 1, then accordingly flow through the inlet channel 11 of the inlet assembly 1, the entrance 300a, the axial channel 351, the cave 301, the gaps 345, the space 31a, the gaps 334, and the exit 300b where finally, being discharged to the external space through the outlet pipe 21 of the outlet assembly 2. In which, the water flowing through the operation room 303 will be irradiated by the above mentioned ultraviolet light to achieve the sterilization purpose.

Figure 6:
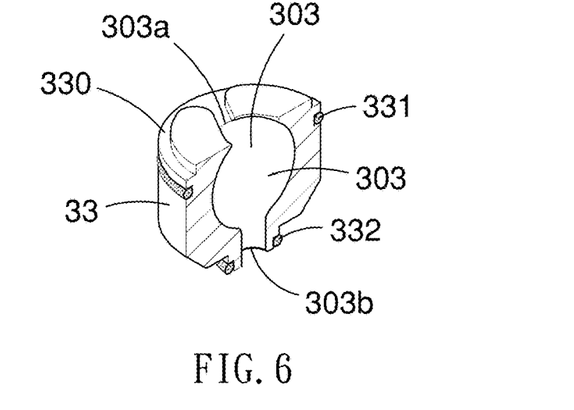
FIG. 6 is a cross-sectional view of the chamber of the preferred embodiment of the present invention.
Figure 7:
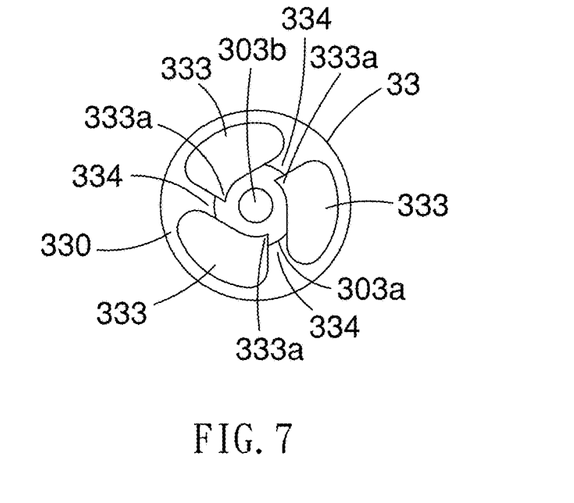
FIG. 7 is a bottom view of the chamber of the preferred embodiment of the present invention.

Preferably, referring to the FIGS. 2 and 6, the operation room 303 of the chamber 33 can be of sphere shaped, but not limited to so. In the embodiment, as the inner walls of the sphere shaped operation room 303 are a spherical surface, the ultraviolet light projected into the operation room 303 can be reflected multiple times as possible within due to its shape, thereby improving the sterilization of the water. Additionally, the internal diameters of the two openings 303*a* and 303*b* of the operation room 303 are smaller than of the operation room 303.

Figure 9:
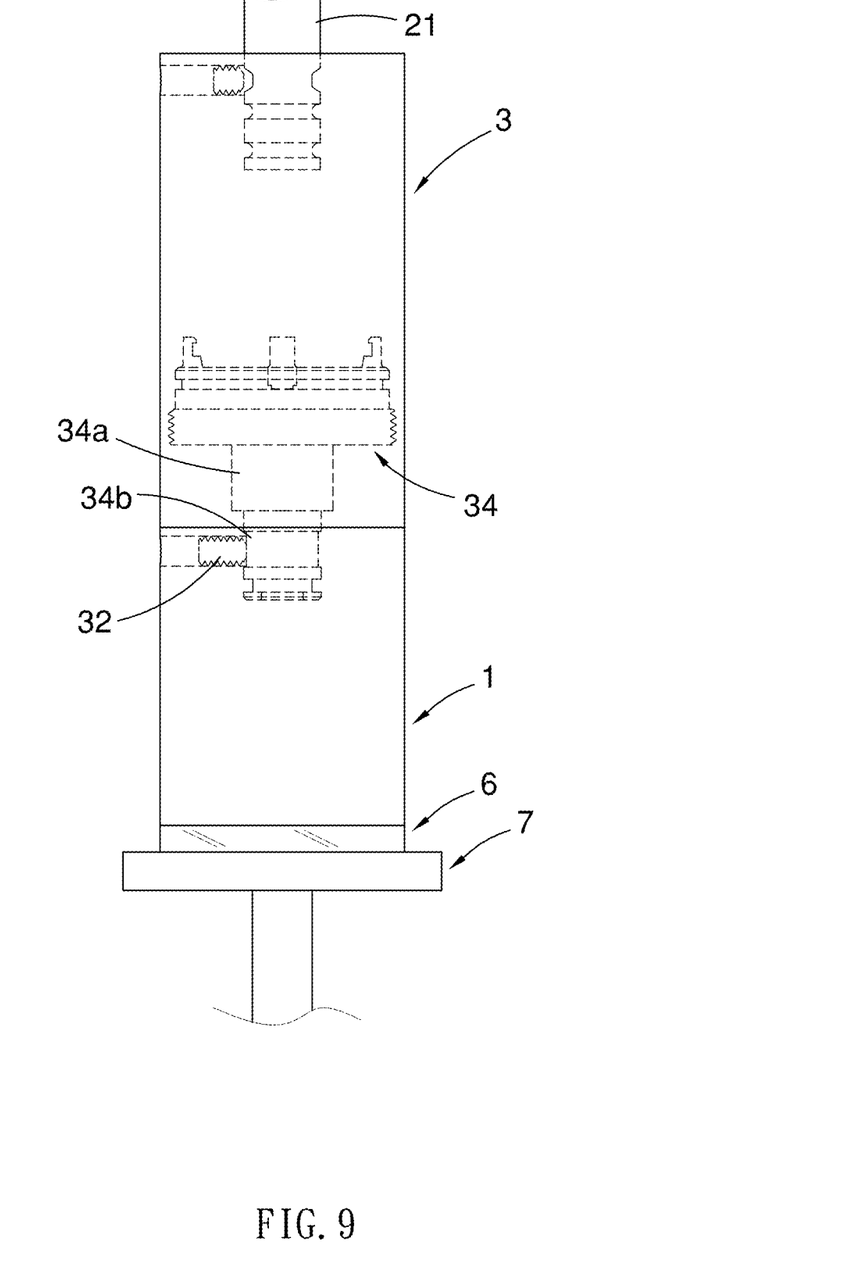
FIG. 9 is a side view of the preferred embodiment of the present invention.

Preferably, referring to FIG. 9, an end of a bolt 32 in the inlet assembly 1 is extended into a ring groove 34*b* on the extending section 34*a* of the seat 34, so that the operation assembly 3 cannot be drawn away from the inlet assembly 1 but can be rotated on the inlet assembly 1.

Preferably, the ultraviolet light-emitting faucet of the present invention also comprise a detecting device (not shown) coupled to the waterproof light emitting module 5, the detecting device detects whether the water is entering the inlet channel 11 of the inlet assembly 1 and activates the waterproof light emitting module 5 when the detecting result is "Yes", and deactivates the waterproof light emitting module 5 when the detecting result is "No". This way, the ultraviolet light-emitting faucet of the present invention will only emit the ultraviolet light to sterilize the water when the water is being supplied for usage. However, the detecting device is not a necessity as the manner of coupling the automatic manoeuvre set 12*a* to the waterproof light emitting module 5 can also be adopted. In this manner, when the sensing device 122 sends the signal to turn on the inlet control valve, the waterproof light emitting module 5 is also turned on, and when the inlet control valve is turned off automatically, the waterproof light emitting module 5 is also turned off.

Referring to FIGS. 1 and 3, the ultraviolet light-emitting faucet of the present invention can further comprise an indicating device 6, but not limited to so. In which, the indicating device 6 is positioned to a lower surface 101 of the inlet assembly 1, but it can also be positioned between the outlet assembly 2 and the operation assembly 3, or positioned between the operation assembly 3 and the inlet assembly 1, or other positions. Regardless, the indicating device 6 comprises at least a casing 61 and one or a plurality of visible light emitting elements 62. The casing 61 has a transmitting portion 610, the light emitted by the visible light emitting element 62 can be projected through the transmitting portion 610. The light emitted by the visible light emitting element 62 can be of colour blue, orange, red or other colours. In the embodiment, the visible light emitting element 62 is a blue light LED, so it emits blue light. Preferably, in the embodiment, the casing 61 comprises an upper casing 611 and a lower casing 612 that are relatively connected together top and bottom. The lower casing 612 is made of transparent material, such as transparent acrylic or glass, the upper casing 611 can be made of the same material but does not have to be transparent. As of now, the transmitting portion 610 is formed on the lower casing 612, or in other words, the transmitting portion 610 is the lower casing 612. Additionally, an annular seal 613 can further be disposed between the upper casing 611 and the lower casing 612 to prevent the water from penetrating inside the casing 61, but is not necessary. Moreover, the visible light emitting element 62 is disposed on a circuit board 621 in the casing 61. The wires 622 connected to the circuit board 621 will pass through a through-hole 614 of the casing 61 then connects to the domestic power supply. The cable 52 will continue to pass through the through-hole 614 after passing through the cable channel 14 of the inlet assembly 1. In which, the casing 61 also has another through-hole 615 for the inlet pipe 4 to pass through; the through-hole 615 is facing the inlet channel 11 of the inlet assembly 1, Preferably, the visible light emitting elements 62 of the indicating device 6 can further be coupled to the above mentioned automatic manoeuvre set 12*a* or the detecting device. In the case where the visible light emitting element 62 is coupled to the automatic manoeuvre set 12*a*, the visible light emitting element 62 is turned on when the sensing device 122 sends out the signal to cause the inlet control valve to turn on, and when the inlet control valve is automatically turned off, the light emitting element 62 is turned off. In the case where the visible light emitting element 62 is coupled to the detecting device, the visible light emitting element 62 is turned on when the detecting result of the detecting device is "Yes", and the light emitting element 62 is turned off when the detecting result is "No". In short, the visible light emitting element 62 stays in a light emitting state whilst the waterproof light emitting module 5 is activated. This is to inform people that the water is currently being sterilized by the ultraviolet light. Once the waterproof light emitting module 5 is turned off, the light emitting element 62 will then turned off as well.

Referring to FIGS. 1-3, the ultraviolet light-emitting faucet of the present invention can further comprise a base 7, but it is not necessary. Wherein, the base 7 is configured to a lower surface 600 of the indicating device 6, however, in case without using the indicating device 6, the base 7 is directly configured to the lower surface 101 of the inlet assembly 1. When the ultraviolet light-emitting faucet of the present invention is assembled onto a kitchen counter, the base 7 is tightly leaning on a surface of the kitchen counter. In short, the base 7 is tightly clamped between the inlet assembly 1 and the surface, and the indicating device 6 is tightly clamped between the base 7 and the inlet assembly 1. Preferably, an annual seal 71 can also be disposed between the base 7 and the indicating device 6 or inlet assembly 1. Additionally, another annual seal 72 can further be disposed on a lower surface 700 of the base 7. Nevertheless, the base also has two through-holes 73 and 74 passing through from top to bottom. Wherein, the through-hole 73 is facing the through-hole 615 of the casing 61 of the indicating device 6 and allows the mentioned above inlet pipe 4 to pass through, and the other through-hole 74 allows the above-mentioned cable 52 and/or wires 622 to pass through.

Figure 10:
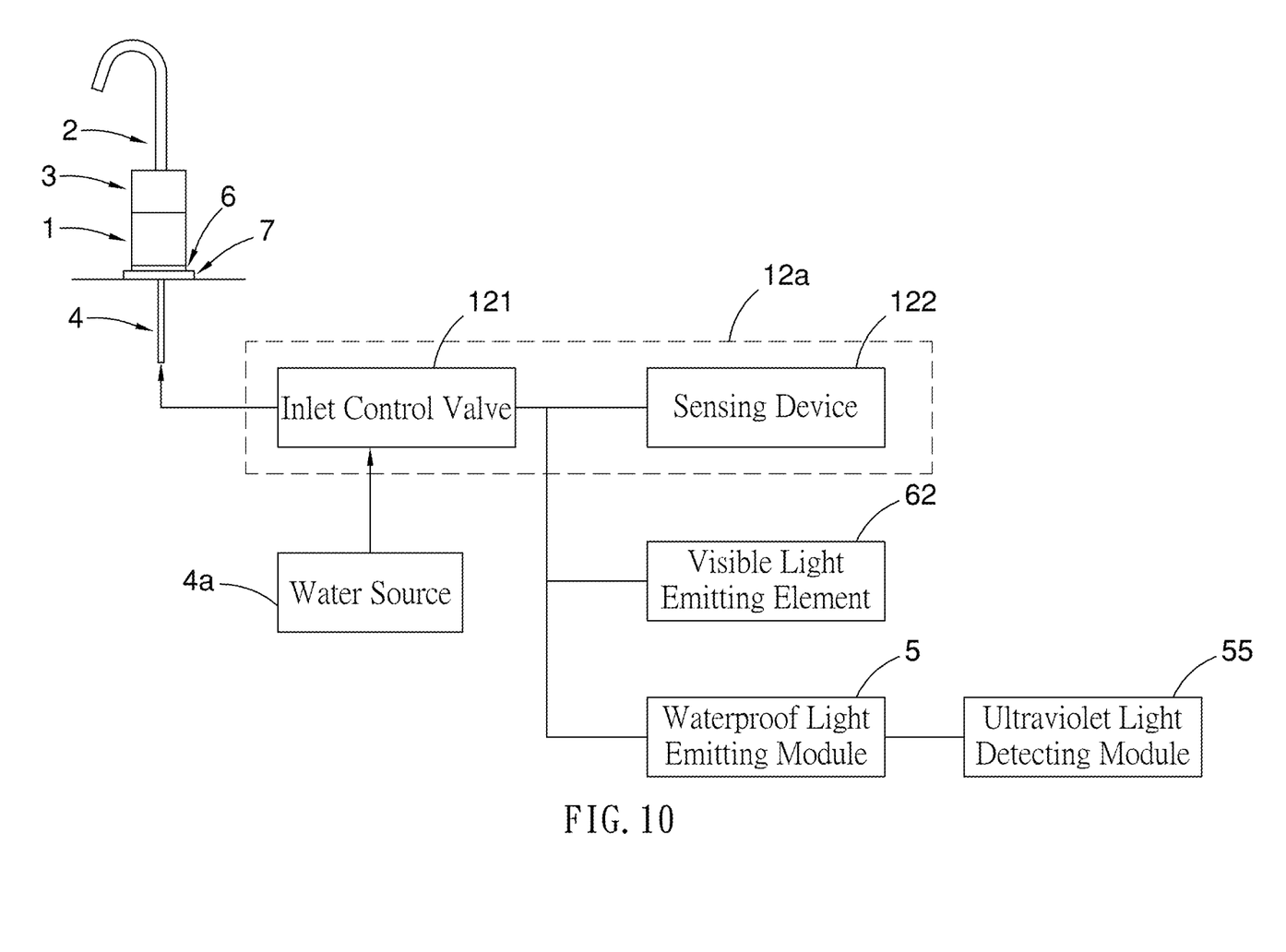
FIG. 10 is a functional block diagram of another embodiment of the present invention.

Referring to FIG. 10, the ultraviolet light-emitting faucet of the present invention further comprises an ultraviolet light detecting module 55, the ultraviolet light detecting module 55 is coupled to the waterproof light emitting module 5 and can generate a notification signal when it detects that the waterproof light emitting module 5 cannot emit the ultraviolet light. The notification signal can be of a warning sound or a warning light or both. For example, when a current detecting circuit (not show) of the ultraviolet light detecting module 55 detects no current flowing through the UV LED, this means that the waterproof light emitting module 5 cannot emit ultraviolet light. In this instance, the current detecting circuit will send out a signal to activate a warning light and/or an alarm of the ultraviolet light detecting module and therefore generating the warning sound and/or the warning light.

In summary, it can be seen that the ultraviolet light faucet of the present invention can sterilize the water flowing through the operation assembly 3 through the waterproof light-emitting module 5. Additionally, if needed, an indicating device 6 can be configured to emit a sterilization indicating light, such as blue light, to subsequently inform people that the water is currently in a sterilization process. Moreover, the present invention can be further configured with the mentioned above automatic manoeuvre set 12a and/or detecting device to increase the convenience of usage.

What is claimed is:

1. An ultraviolet light-emitting faucet comprising:
an inlet assembly comprising an inlet channel;
an outlet assembly comprising an outlet pipe; and
an operation assembly configured between the inlet assembly and the outlet assembly and comprising a conduit and an operation room in communication, the conduit comprising an entrance and an exit, the entrance receiving the water from the inlet channel, the exit discharging the water, the operation room disposed between the entrance and the exit of the conduit and comprising at least two openings, wherein one of the openings is for the water to flow into the operation room and the other opening is for the water to flow out of the operation room; and
a waterproof light emitting module configured in the conduit of the operation assembly and capable of generating an ultraviolet light to emit into the operation room through either one of the two openings of the operation room.

2. The ultraviolet light emitting faucet according to claim 1, wherein the waterproof light emitting module is disposed between the entrance of the conduit and the opening that is for the water to flow into the operation room, and the ultraviolet light generated by the waterproof light emitting module is emitted into the operation room through the opening that is for the water to flow into the operation room.

3. The ultraviolet light-emitting faucet according to claim 1, wherein the waterproof light emitting module is disposed between the exit of the conduit and the opening that is for the water to flow out of the operation room, and the ultraviolet light generated by the waterproof light emitting module is emitted into the operation room through the opening that is for the water to flow out of the operation room.

4. The ultraviolet light-emitting faucet according to claim 1, wherein the operation room is of sphere shaped, and the two openings have smaller internal diameters than the operation room.

5. The ultraviolet light-emitting faucet according to claim 1, wherein the waterproof light emitting module comprises a waterproof casing and a circuit board disposed in the waterproof casing, the waterproof casing comprises a light emitting surface, the light emitting surface faces either one of the two openings of the operation room, and the ultraviolet light generated from one or a plurality of ultraviolet light LEDs on the circuit board is emitted to one of the openings of the operation room through the light emitting surface of the waterproof casing.

6. The ultraviolet light-emitting faucet according to claim 1, wherein the operation assembly comprises:
a housing having a receiving room, one end of the receiving room communicating with the exit of the conduit, the other end of the receiving room connecting with the inlet assembly;
a chamber fitted into the receiving room of the housing; and
a seat secured in the receiving room of the housing and having a cave and an axial channel, the cave receiving the waterproof light emitting module, and the cave and the waterproof light emitting module have at least a gap in between, one end of the axial channel forming into the entrance of the conduit, the other end of the axial channel and the cave are in communicating; wherein the waterproof light emitting module and the housing maintain a space and the space communicates with the gap.

7. The ultraviolet light-emitting faucet according to claim 6, wherein the seat comprises a plurality of hooks extending in the direction towards the chamber, the plurality of hooks hook onto a periphery of the waterproof light emitting module.

8. The ultraviolet light-emitting faucet according to claim 6, wherein the waterproof light emitting module comprises a waterproof casing, a circuit board disposed in the waterproof casing, and a cable connected to the circuit board and extending out of the waterproof casing, wherein the waterproof casing further comprises a light emitting surface, the light emitting surface faces one of the openings of the operation room, the ultraviolet light generated from one or a plurality of the ultraviolet light LEDs on the circuit board is emitted to one of the openings of the operation room through the light emitting surface of the waterproof casing, the seat comprises a cable aperture in communication with the cave, the inlet assembly comprises a cable channel, and the cable of the waterproof light emitting module passes through the cable aperture of the seat and the cable channel of the inlet assembly.

9. The ultraviolet light-emitting faucet according to claim 6, wherein the chamber comprises a plurality of protrusive portions, the protrusive portions are disposed around the opening that is for allowing the water to flow into the operation room and sit on the waterproof light emitting module, wherein the protrusive portions also maintain a gap between each other.

10. The ultraviolet light-emitting faucet according to claim 9, wherein each of the protrusive portions comprises an end protruding into the opening that is for allowing the water to flow into the operation room of the operation assembly.

11. The ultraviolet light-emitting faucet according to claim 6, wherein a securing ring is secured in the housing of the operation assembly and abuts against the seat.

12. The ultraviolet light-emitting faucet according to claim 6, wherein the seat has an extending section and the extending section is fitted into the inlet channel of the inlet assembly so the inlet channel communicates with the axial channel formed in the extending section.

13. The ultraviolet light-emitting faucet according to claim 12, comprising a bolt secured in the inlet assembly, wherein one end of the bolt is extended into a ring groove of the extending section of the seat.

14. The ultraviolet light-emitting faucet according to claim 1, comprising a sensing device coupled to the waterproof light emitting module, wherein the sensing device senses the water entering the inlet channel of the inlet assembly and turns on the waterproof light emitting module, wherein the waterproof light emitting module turns off when the sensing device senses no water in the inlet channel of the inlet assembly.

15. The ultraviolet light-emitting faucet according to claim 1, comprising an automatic manoeuvre set, the automatic manoeuvre set comprising an inlet control valve connected to the inlet assembly and a sensing device coupled to the inlet control valve, a water source connected to the inlet control valve, wherein the sensing device controlling the on and off of the inlet control valve to decide if the water from the water source is to enter the inlet channel of the inlet assembly, wherein the automatic manoeuvre set is further coupled to the waterproof light emitting module, wherein when the sensing device commands the inlet control valve to turn on, the waterproof light emitting module will turn on as well, and when the inlet control valve automatically turn off, the waterproof light emitting module will turn off as well.

16. The ultraviolet light-emitting faucet according to claim 1, comprising an indicating device, the indicating device comprising a casing, and a visible light emitting element located in the casing, the casing having a transmitting portion, wherein the light emitted by the visible light emitting element is emitted through the transmitting portion.

17. The ultraviolet light-emitting faucet according to claim 16, wherein the indicating device is configured to a lower surface of the inlet assembly, the operation assembly is configured to an upper surface of the inlet assembly.

18. The ultraviolet light-emitting faucet according to claim 16, comprising a base, the base having two adjacent holes, wherein the indicating device is tightly clamped between the base and the inlet assembly, and the casing of the indicating device has two adjacent through-holes, wherein the two ends of one of the through-holes respectively face one of the holes of the base and the inlet channel of the inlet assembly.

19. The ultraviolet light-emitting faucet according to claim 16, comprising an automatic manoeuvre set, the automatic manoeuvre set comprising an inlet control valve connected to the inlet assembly and a sensing device coupled to the inlet control valve, wherein the inlet control valve is connected to a water source and the sensing device controls the on and off of the inlet control valve to determine if the water supplied by the water source enters the inlet channel of the inlet assembly, wherein the automatic manoeuvre set is also coupled to the waterproof light emitting module and the visible light emitting element, wherein when the sensing device controls the inlet control valve to turn on, the waterproof light emitting module and the visible light emitting element will turn on as well, wherein when the inlet control valve automatically turns off, the waterproof light emitting module and the visible light emitting element will turn off as well.

20. The ultraviolet light-emitting faucet according to claim 1, comprising an ultraviolet light detecting module, wherein the ultraviolet light detecting module is coupled to the waterproof light emitting module and can generate a warning signal when detecting the waterproof light emitting module cannot emit ultraviolet light.

* * * * *